United States Patent

Sasagawa et al.

Patent Number: 5,578,658
Date of Patent: Nov. 26, 1996

[54] HIGH-SPEED POLYMERIZABLE RESIN COMPOSITION AND LENSES OBTAINED THEREFROM

[75] Inventors: Katsuyoshi Sasagawa; Kenichi Fujii; Noboru Kawasaki; Toshiyuki Suzuki, all of Kanagawa-ken, Japan

[73] Assignee: Mitsui Toatsu Chemicals, Inc., Tokyo, Japan

[21] Appl. No.: 352,811

[22] Filed: Dec. 1, 1994

[30] Foreign Application Priority Data

Dec. 20, 1993 [JP] Japan ................................. 5-319487

[51] Int. Cl.$^6$ .......................... C08G 18/38; C08G 18/67; G02C 7/02
[52] U.S. Cl. .......................... 523/105; 523/106; 351/159; 524/547; 525/539; 528/60; 528/81
[58] Field of Search ..................... 523/106, 105; 528/60, 81; 351/159; 524/547; 525/539

[56] References Cited

U.S. PATENT DOCUMENTS

| | | | |
|---|---|---|---|
| 4,108,840 | 8/1978 | Friedlander | 528/75 |
| 4,689,387 | 8/1987 | Kajimoto et al. | 528/81 |
| 4,775,733 | 10/1988 | Kanemura et al. | 528/81 |
| 5,214,116 | 5/1993 | Matsuoka et al. | 526/286 |
| 5,395,909 | 3/1995 | Shimuta et al. | 528/60 |

FOREIGN PATENT DOCUMENTS

| | | |
|---|---|---|
| 378895 | 7/1990 | European Pat. Off. . |
| 0490777 | 6/1992 | European Pat. Off. ............ 528/60 |
| 549391 | 6/1993 | European Pat. Off. . |
| 1-96208 | 4/1989 | Japan . |
| 5-25240 | 2/1993 | Japan . |

OTHER PUBLICATIONS

Database WPI, Week 9310, Derwent Publications Ltd., London, Great Britain, AN 93-080455 & JP-A-5 025 240 (Mitsubishi Rayon Co. Ltd.), Feb. 2, 1993.

*Primary Examiner*—Paul R. Michl
*Assistant Examiner*—Andrew E. C. Merriam
*Attorney, Agent, or Firm*—Burns, Doane, Swecker & Mathis

[57] ABSTRACT

Described are a high-speed polymerizable resin composition and a lens obtained from it. The composition comprises:

a) at least 70 but smaller than 90 parts by weight of a mixture composed of:
  i) an aromatic polyisocyanate compound represented by the following formula (I):

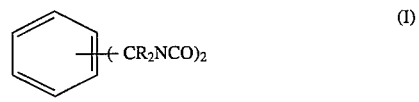

wherein R represents a hydrogen atom or a methyl group, and
  ii) a polythiol having at least 3 mercapto groups per molecule and a sulfur content of at least 40 wt. %; and
b) at least 10 but smaller than 30 parts by weight of a compound which has, in a molecule, at least one functional group selected from a hydroxyl group or a mercapto group and also at least one functional group selected from an acrylic group, methacrylic group or styrylic group, said composition containing isocyanato groups.

4 Claims, No Drawings

HIGH-SPEED POLYMERIZABLE RESIN COMPOSITION AND LENSES OBTAINED THEREFROM

BACKGROUND OF THE INVENTION

1. Field of the Invention

This invention relates-to a resin composition having high-speed polymerizability and a plastic lens obtained therefrom. The lens obtained from the composition of the present invention has a refractive index ($n_d$) of at least 1.59.

2. Description of the Related Art

Plastic lenses are lightweight and non-fragile compared with inorganic glass lenses so that they are finding rapidly increasing utility as eyeglass lenses, camera lenses or optical elements in recent years.

Resins widely employed these days for such purposes include a radical polymerization product of diethylene glycol bis(allyicarbonate) (for example, "CR-39", trade name; product of PPG). This resin has various advantages such as excellent impact resistance, lightweight, superb dyeability, and good workability such as good cutting and grinding machinability. Its refractive index, however, is 1.50 which is lower than the refractive index (1.52) of inorganic glass. To obtain optical characteristics comparable with those of a glass lens, it is necessary to increase the refractive index of the plastic lens, which unavoidably increases its central thickness or peripheral thickness, resulting in an overall large thickness. There is accordingly an outstanding desire for the development of a lens resin having a still higher refractive index.

The present inventors have already proposed a plastic lens made of a sulfur-containing urethane resin which can be prepared by the polymerization of a polyisocyanate and a polythiol (Japanese Patent Publication No. 15249/1992). The resin has a high refractive index ($n_d$) of 1.57 or higher and also has various advantages like CR-39 so that it is used widely now. The resin, however, is accompanied with the problem that it requires long polymerization time and any attempt to complete the polymerization in a short time tends to result in a lens with optical unevenness (striae).

With a view toward improving the thermal deformation temperature, the present inventors have also proposed a composition which contains, in addition to the sulfur-containing urethane resin, a hydroxyl- or mercapto-containing acrylate, methacrylate or styrene (Japanese Patent Laid-Open No. 96208/1989). When a lens resin is prepared using the composition, it has an improved thermal deformation temperature. When polymerized at a high speed, however, the resin composition develops optical unevenness (striae) and in addition, cannot always provide a sufficient refractive index.

A composition capable of providing a plastic lens with an improved thermal deformation temperature and improved surface hardness in a similar manner has also been proposed (Japanese Patent Laid-Open No. 25240/1993). This composition has a relatively high refractive index but is accompanied with the drawback that due to the use of tolylene diisocyanate, it will be tinged yellow by ultraviolet rays in sun light as time goes on.

SUMMARY OF THE INVENTION

An object of the present invention is to provide a sulfur-containing urethane resin composition having high-speed polymerizability add a refractive index ($n_d$) of at least 1.59 and does not develop yellowing with the passage of time.

The present inventors have conducted extensive research with a view toward developing a resin composition which has a refractive index ($n_d$) of 1.59 or higher and also high-speed polymerizability without the need for tolylene diisocyanate. As a result, it has been found that use of a polythiol having at least 3 mercapto groups makes it possible to provide the polymerized resin with heat resistance sufficiently to withstand, as a plastic lens, heat at the time of polishing or dyeing; use of a polythiol having a sulfur content of 40 wt. % or greater can always provide the resulting resin with a refractive index ($n_d$) of 1.59 or higher; and further, use of such a polythiol can provide a sulfur-containing resin composition which hardly develops optical unevenness (striae), which is, a fatal defect for a plastic lens, even when polymerized at a high speed and does not undergo yellowing with the passage of time, leading to the completion of the invention. The present invention therefore provides a high-speed polymerizable resin composition which comprises:

a) at least 70 but smaller than 90 parts by weight of a mixture composed of:
  i) an aromatic polyisocyanate compound represented by the following formula (I):

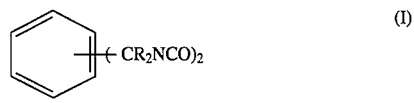

wherein R represents a hydrogen atom or a methyl group, and
  ii) a polythiol having at least 3 mercapto groups per molecule and a sulfur content of at least 40 wt. %; and b) at least 10 but smaller than 30 parts by weight of a compound which has, in a molecule, at least one functional group selected from a hydroxyl group or a mercapto group and at least one functional group selected from an acrylic group, a methacrylic group or a styrylic group, said composition containing isocyanato groups, mercapto groups and hydroxyl groups at an NCO/(SH+OH) equivalent ratio of from 0.50 to 1.50 and being capable of providing a lens resin having a refractive index ($n_d$) of at least 1.59. The present invention also provides a high refractive-index plastic lens obtained by thermal polymerization of the above composition.

The resin composition according to the present invention does not develop an optically uneven part (striae) in the resulting lens even when the polymerization time is shortened considerably compared with the conventional thermal polymerization of a polyisocyanate and a polythiol alone, does not undergo yellowing with the passage of time and in addition, has high pencil hardness. It is therefore useful as a resin for eyeglass lenses, camera lenses or optical elements.

DETAILED DESCRIPTION OF THE PREFERRED EMBODIMENTS

Specific examples of the aromatic polyisocyanate represented by formula (I) usable in the present invention include compounds such as o-xylylene diisocyanate, m-xylylene diisocyanate, p-xylylene diisocyanate, 1,3-bis($\alpha,\alpha$-dimethylisocyanatomethyl)benzene and 1,4-bis($\alpha,\alpha$-dimethylisocyanatomethyl)benzene. They may be used either singly or in combination.

Illustrative of the compound having at least 3 mercapto groups per molecule and a sulfur content of 40 wt. % or greater include polythiol compounds such as 1,2-bis(mercaptoethyl)trithioglycerin, pentaerythrithiol, 1,2,4-tris(mercaptomethyl)benzene and 1,3,5-tris(mercaptomethyl)benzene.

Examples of the compound which has, in a molecule, at least one functional group selected from a hydroxyl group or a mercapto group and also at least one functional group selected from an acrylic group, a methacrylic group or a styrylic group include compounds obtained by subjecting an epoxy or thiiran group to ring-opening with acrylic or methacrylic acid, such as hydroxyethyl acrylate or hydroxyethyl methacrylate; compounds obtained by subjecting phenylglycidyl ethers to ring-opening with acrylic or methacrylic acid, such as 3-phenoxy-2-hydroxypropyl acrylate and 3-phenoxy-2-hydroxypropyl methacrylate; ring-opened products of 2,4-dibromophenylglycidyl ethers with acrylic or methacrylic acid; ring-opened products of bisphenol A diglycidyl ethers with acrylic or methacrylic acid; and compounds such as 1,3-bis(acryloyl)glycerin, 1,3-bis-(methacryloyl)glycerin, 1-acryloyl-2-methacryloyl glycerin, hydroxymethylstyrene and mercaptomethylstyrene.

These compounds exemplified above are sold on the market so that they are available rather easily.

The high-speed polymerizable resin composition according to the present invention, which is suitable for use in the production of a high refractive-index lens, can be prepared using in combination:

a) at least 70 but smaller than 90 parts by weight of a mixture of:
  i) an aromatic polyisocyanate compound represented by formula (I), and
  ii) a polythiol having at least 3 mercapto groups per molecule and a sulfur content of at least 40 wt. %; and b) at least 10 but smaller than 30 parts by weight of a compound which has, in a molecule, at least one functional group selected from a hydroxyl group or a mercapto group and also at least one functional group selected from an acrylic group, a methacrylic group or a styrylic group. Use of the component b) in an amount smaller than 10 parts by weight cannot sufficiently improve the surface hardness. An amount greater than 30 parts by weight, however, tends to result in a lower refractive index.

In the resin composition according to the present invention, the ratio of an equivalent amount of SH and OH groups to an equivalent amount of NCO groups falls within the range of from 0.50 to 1.50, preferably from 0.75 to 1.25 in terms of NCO/(SH+OH). Ratios smaller than 0.50 or greater than 1.50 tend to make it difficult to furnish a resin with high rigidity.

To obtain a plastic lens from the resin composition of the present invention, the composition is subjected to thermal polymerization. At this time, to accelerate urethanizing polymerization between the polyisocyanate and the polythiol, a polymerization catalyst such as a tin compound, e.g., dibutyltin dilaurate or dimethyltin dichloride, morpholine or dimethylaminobenzene may be added in an amount of 0.001–1.0 wt. % based on the total amount of the resin composition. To accelerate polymerization of acrylic, methacrylic or styrylic groups, a peroxide such as benzoyl peroxide, dicumyl peroxide or di-t-butylperoxide can be added in an amount of 0.01–3.0 wt. % based on the total amount of the resin composition.

When the high-speed polymerizable resin composition according to the present invention is polymerized by cast polymerization or the like, it is desired to treat, in advance, the surface of a mold with wax or a silicone- or fluorine-type external mold releasing agent; or to add a silicone- or fluorine-type nonionic surfactant or an anionic surfactant such as an acidic phosphate ester beforehand to the composition of the present invention as an internal addition type mold releasing agent. When the internal-addition type mold releasing agent is used, it is desired to add the agent at 10–20,000 ppm to the composition.

It is also possible to add, as needed, various additives such as ultraviolet absorbers, antioxidants, coloring preventatives and/or fluorescent dyes to the composition of the present invention so that the resin obtained by the polymerization of the composition can have improved weatherability.

Furthermore, to the composition according to the present invention, at least one of pentaerythritol tetrakis(thioglycolate), pentaerythritol tetrakis($\beta$-mercaptopropionate), trimethylolpropane tris(thioglycolate) and trimethylolpropane tris($\beta$-mercaptopropionate) may be added to an extent not impairing the advantages of the present invention so as to permit the target resin to have improved dyability in a dyeing bath of a disperse dye. In this case, it is preferred to control the amount of the additives lower than 20 parts by weight in the composition to retain the high refractive index.

When a resin for eyeglass lenses, camera lenses or optical elements is prepared by thermally polymerizing the high-speed polymerizable resin composition of the present invention in special molds, the following procedures can be followed by way of example.

Described specifically, a polymerization catalyst, internal-addition type mold releasing agent, ultraviolet absorber and/or the like are(is) optionally added to the composition of the present invention or the composition which has been subjected to preliminary polymerization. After the resulting mixture is homogenized, the liquid so obtained is cast in a glass or metal mold equipped with spacers made of an ethylene-vinyl acetate copolymer, polyvinyl chloride or the like. The liquid in the mold is placed in a thermal polymerization oven, thermally polymerized and then cooled, whereby moldings of a desired shape can be obtained.

Although the cast polymerization time differs with the size of the molding, the time required for the fabrication of a lens from the resin composition according to the present invention is as short as 1/5–1/2 of the time needed for the fabrication of a lens, which has the same strength and is free of optical unevenness (striae), by polymerizing an ordinary sulfur-containing urethane lens resin.

A lens obtained by curing the composition of the present invention has improved surface hardness compared with that obtained by polymerizing a composition composed only of a polyisocyanate and a polythiol.

The present invention will hereinafter be described specifically by the following examples. It should however be borne in mind that this invention is by no means limited to or by the examples, in which all designations of "part" or "parts" mean part or parts by weight.

Among the performance tests of the lens obtained in each example, its refractive index, Abbe's number, specific gravity, workability, optical strain and pencil hardness were determined by the following testing methods, respectively.

Refractive Index and Abbe's Number
  Measured at 20° C. by a Pulfrich refractometer.
Specific Gravity
  Measured by the Archimedes' method.
Workability
  Each lens was ground by a spherical grinder for eyeglass lenses and the lens having a good ground surface was ranked as good (A).
Optical Strain
  Each lens was measured by an optical strain indicator. In visual observation, the lens free of strain was ranked as (A) and the lens with strain was ranked as (B).

was heated at 130° C. for one hour, cooled and then released from the mold, whereby a lens was obtained.

The lens so obtained had a refractive index of 1,595, Abbe's number of 38 and specific gravity of 1.33. It had good,grinding machinability, free of optical strain and had a pencil hardness of 3H.

EXAMPLES 2–5

As in Example 1, a lens was fabricated from each of the compositions shown in Table 1. The results of an evaluation of the lens are presented in Table 2.

TABLE 1

| Example | Polyisocyanate (mole) | Polythiol (mole) | 01 or thiol* (mole) |
|---|---|---|---|
| 2 | m-Xylylene diisocyanate (1.0) | 1,2-Bis(mercapto-ethyl)trithio-glycerin (0.5) | 1-Methacryloyl-3-acryloyl-glycerin (0.5) |
| 3 | p-Xylylene diisocyanate (1.0) | 1,2-Bis(mercapto-ethyl)trithiogly cerin (0.35) Pentaerythrithiol (0.10) | Hydroxyethyl methacrylate (0.30) |
| 4 | 1,3-Bis($\alpha,\alpha$-di-methylisocyana-tomethyl)benzene (1.0) | 1,2,4-Tris(merca-ptomethyl)benzene (0.5) | Mercaptomethyl styrene (0.5) |
| 5 | m-Xylylene diisocyanate (1.0) | 1,2-Bis(mercapto-ethyl)trithio-glycerin (0.5) | Hydroxymethyl styrene (0.5) |
| 6 | m-Xylylene diisocyanate (1.0) | 1,2-Bis(mercapto-ethyl)trithiogly-cerin (0.3) Pentaerythritol tetrakis($\beta$-merca-ptopropionate) (0.15) | 1,3-Bis(metha-cryloyl)gly-cerin (0.5) |

*01 or thiol: a compound having both of a hydroxyl or mercapto group and an acrylic, methacrylic or styrylic group.

Pencil Hardness
  Measured according to JIS K-5400.
Weatherability
  Each lens was set in a weather-o-meter equipped with a sunshine carbon arc lamp. Upon an elapsed time of 48 hours, the lens was taken out of the weather-o-meter and was compared in color hue with the same lens resin before the test.
  The observation results Were ranked in accordance with the following standard: no change (A), yellowing (B).

EXAMPLE 1

While cooling at 10° C., 188 parts (1.0 mole) of m-xylylene diisocyanate, 130 parts (0.5 mole) of 1,2bis(mercaptoethyl)trithioglycerin and 114 parts (0.5 mole) of 1,3-bis(methacryloyl)glycerin were mixed. To concentrations of 50 ppm, 1000 ppm and 3000 ppm of the whole mixture, dibutyltin dichloride, di-t-butyl peroxide and acidic dioctyl phosphate were added, respectively, followed by further mixing to obtain a homogeneous mixture. The homageneous mixture so obtained was cast in a mold for the fabrication of an eyeglass lens having a diopter of–4. The mold was formed of a glass mold equipped with a gasket. The mixture in the mold was heated from 45° C. to 130° C. over three hours for thermal polymerization. The polymer so obtained

COMPARATIVE EXAMPLE 1

While cooling at 10° C., 188 parts (1.0 mole) of mxylylene diisocyanate and 172 parts (0.66 mole) of 1,2-bis-(mercaptoethyl)trithioglycerin were mixed. To concentrations of 50 ppm and 3000 ppm of the whole mixture, dibutyltin dichloride and acidic dioctyl phosphate were added respectively, followed by further mixing to obtain a homogeneous mixture. The mixture so obtained was cast in a mold for the fabrication of an eyeglass lens having a diopter of–4. The mold was formed of a glass mold equipped with a gasket.

As in Example 1, a lens was obtained. The properties of the lens so obtained are presented in Table 2.

COMPARATIVE EXAMPLE 2

While cooling at 10° C., 188 parts (1.0 mole) of mxylylene diisocyanate and 244 parts (0.5 mole) of pentaerythritol tetrakis(mercaptopropionate) were mixed. To concentrations of 50 ppm and 3000 ppm of the whole mixture, dibutyltin dichloride and acidic dioctyl phosphate were added respectively, followed by further mixing to obtain a homogeneous mixture. The mixture so obtained was cast in a mold for the fabrication of an eyeglass lens having a diopter of–4. The mold was formed of a glass mold equipped with a gasket.

As in Example 1, a lens was obtained. The properties of the lens so obtained are presented in Table 2.

COMPARATIVE EXAMPLE 3

In a similar manner to Example 1 except that 188 parts (1.0 mole) of m-xylylene diisocyanate, 195 parts (0.4 mole) of pentaerythritol tetrakis(3-mercaptopropionate) and 52 parts (0.4 mole) of hydroxyethyl methacrylate were used instead, a lens was fabricated. The properties of the lens so obtained are presented in Table 2.

COMPARATIVE EXAMPLE 4

In a similar manner to Example 1 except that 188 parts (1.0 mole) of m-xylylene diisocyanate, 136 parts (0.80 mole) of 1,3-xylylenedithiol and 102 parts (0.20 mole) of bisphenol A diglycidyl ether which had been ring-opened with methacrylic acid were used instead, a lens was fabricated. The properties of the lens so obtained are shown in Table 2.

TABLE 2

|  | Refractive index | Abbe's number | Specific gravity | Grind machinability | Optical strain | Pencil hardness |
|---|---|---|---|---|---|---|
| Example 1 | 1.595 | 38 | 1.33 | A | Not observed | 3H |
| Example 2 | 1.596 | 38 | 1.33 | A | Not observed | 3H |
| Example 3 | 1.630 | 33 | 1.34 | A | Not observed | 4H |
| Example 4 | 1.615 | 32 | 1.32 | A | Not observed | 3H |
| Example 5 | 1.607 | 36 | 1.33 | A | Not observed | 3H |
| Example 6 | 1.594 | 37 | 1.33 | A | Not observed | 3H |
| Comp. Ex. 1 | 1.659 | 32 | 1.35 | A | Observed | HB |
| Comp. Ex. 2 | 1.594 | 36 | 1.34 | A | Observed | HB |
| Comp. Ex. 3 | 1.567 | 38 | 1.33 | A | Not observed | H |
| Comp. Ex. 4 | 1.588 | 34 | 1.32 | A | Observed | HB |

COMPARATIVE EXAMPLE 5–9

In a similar manner to Comparative Example 1 except that the heating time from 45° C. to 130° C. for thermal polymerization was changed as shown in Table 3, lenses were fabricated. The optical strain of each lens so obtained was observed and the result is shown in Table 3.

TABLE 3

| Comparative example | Time required for heating from 45° C. to 130° C. | Optical strain |
|---|---|---|
| Comp. Ex. 5 | 5 hours | Observed |
| Comp. Ex. 6 | 8 hours | Observed |
| Comp. Ex. 7 | 11 hours | Observed |
| Comp. Ex. 8 | 14 hours | Slightly Observed |
| Comp. Ex. 9 | 17 hours | Not observed |

EXAMPLE 7

In a similar manner to Example 1 except that 500 ppm of "Tinuvin® PS" (trade name for an ultraviolet absorber; product of CIBA-GEIGY AG) were added further to the composition, a lens was fabricated. The color hue of the lens after the weatherability test was compared with that before the test. As a result, no change (A) was recognized. In addition, it was free of optical strain.

COMPARATIVE EXAMPLE 10

In a similar manner to Example 1 except that 188 parts (1.0 mole) of m-xylylene diisocyanate were replaced by a mixture of 94 parts (0.5 mole) of m-xylylene diisocyanate and 87 parts (0.5 mole) of 2,4-tolylene diisocyanate, and 500 ppm of "Tinuvin® PS" were added to the composition, the mixture was treated. An exothermic reaction then occurred and the mixture became so thick so that fabrication of a lens was hardly feasible.

In a similar manner to Example 1 except that mixing was conducted while cooling the mixture at −5° C. or lower, a lens was fabricated. The color hue of the lens after the weatherability test was compared with that before the test. As a result, marked yellowing (B) was observed. In addition, optical strain of the lens was eminent.

What is claimed is:

1. A plastic lens having a refractive index of at least 1.59 and being free of optical strain, which has been obtained by thermally polymerizing in a short time a high-speed polymerizable resin composition comprising:

a) at least 70 but smaller than 90 parts by weight of a mixture composed of:

i) an aromatic polyisocyanate compound represented by the following formula (I):

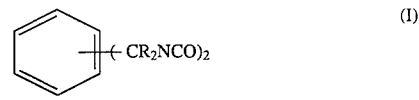

(I)

wherein R represents a hydrogen atom or a methyl group, and ii) at least one polythiol having a sulfur content of at least 40 percent by weight and selected from the group consisting of 1,2-bis(mercaptoethyl)trithioglycerin, pentaerythrithiol, 1,2,4-tris(mercaptomethyl)benzene and 1,3,5-tris(mercaptomethyl)benzene; and b) at least 10 but smaller than 30 parts by weight of a compound selected from the group consisting of hydroxyethyl acrylate, hydroxyethyl methacrylate, 1,3-bis(acryloyl)glycerin, 1,3-bis(methyacryloyl)glycerin, 1-acryloyl-3-methacryloyl glycerin, 1-methacryloyl-3-acryloyl glycerin, hydroxymethylstyrene and mercaptomethylstyrene, said composition containing isocyanato groups, mercapto groups and hydroxyl groups at an NCO/(SH+OH) equivalent ratio of from 0.50 to 1.50.

2. The plastic lens according to claim 1 wherein the resin composition further comprises at least one of pentaerythritol tetrakis (thioglycolate), pentaerythritol tetrakis(β-mercaptopropionate), trimethylolpropane tris(thioglycolate) and trimethylolpropane tris(β-mercaptopropionate) in an amount smaller than 20 parts by weight.

3. The plastic lens according to claim 1 wherein the aromatic polyisocyanate compound represented by formula (I) is at least one compound selected from the group consisting of o-xylylene diisocyanate, m-xylylene diisocyanate, p-xylylene diisocyanate, 1,3-bis($\alpha,\alpha$-dimethylisocyanatomethyl)benzene and 1,4-bis($\alpha,\alpha$-dimethylisocyanatomethyl)benzene.

4. The plastic lens according to claim 3 wherein the polyisocyanate compound is at least one compound selected from the group consisting of m-xylylene diisocyanate, p-xylylene diisocyanate and 1,3-bis($\alpha,\alpha$-dimethylisocyanatomethyl)benzene.

* * * * *